(12) United States Patent
Noishiki et al.

(10) Patent No.: US 10,376,812 B2
(45) Date of Patent: Aug. 13, 2019

(54) EXTRACTION AND SEPARATION METHOD

(71) Applicant: KOBE STEEL, LTD., Kobe-shi (JP)

(72) Inventors: Koji Noishiki, Takasago (JP); Akira Matsuoka, Kobe (JP); Yuji Kurishiro, Kobe (JP)

(73) Assignee: KOBE STEEL, LTD., Kobe-shi (JP)

( * ) Notice: Subject to any disclaimer, the term of this patent is extended or adjusted under 35 U.S.C. 154(b) by 381 days.

(21) Appl. No.: 15/029,122

(22) PCT Filed: Oct. 22, 2014

(86) PCT No.: PCT/JP2014/078150
§ 371 (c)(1),
(2) Date: Apr. 13, 2016

(87) PCT Pub. No.: WO2015/076052
PCT Pub. Date: May 28, 2015

(65) Prior Publication Data
US 2016/0250565 A1    Sep. 1, 2016

(30) Foreign Application Priority Data

Nov. 21, 2013   (JP) .................................. 2013-240627

(51) Int. Cl.
*B01D 11/04* (2006.01)
*B01D 11/00* (2006.01)

(52) U.S. Cl.
CPC .......... *B01D 11/0453* (2013.01); *B01D 11/04* (2013.01); *B01D 11/0446* (2013.01);
(Continued)

(58) Field of Classification Search
CPC ............ B01D 11/0453; B01D 11/0488; B01D 11/0496; B01D 11/028; B01D 11/0257;
(Continued)

(56) References Cited

U.S. PATENT DOCUMENTS 2,022,259 A   11/1935  Starr
4,338,285 A    7/1982  Eberts
(Continued)

FOREIGN PATENT DOCUMENTS

CN      101898048 A      12/2010
EP      2 500 086 A2      9/2012
(Continued)

OTHER PUBLICATIONS

Kenig, E., et al, "Micro-separation of fluid systems: a state of the art review", Separation and Purification Technology, 120, pp. 245-264 (2013).*
(Continued)

*Primary Examiner* — Benjamin L Lebron
(74) *Attorney, Agent, or Firm* — Oblon, McClelland, Maier & Neustadt, L.L.P.

(57) ABSTRACT

An extraction and separation method separating a specific component from a raw material fluid using an extraction device including plural stages of extraction units connected sequentially. The extraction and separation method includes: extracting the specific component into an extraction solvent having a difference in specific gravity with respect to that raw material fluid from the raw material fluid while causing the raw material fluid and the extraction solvent to flow in a state of contact with each other in the extraction units for each stage; introducing at least part of the fluid discharged from an extraction unit to the next stage extraction unit in a state wherein the raw material fluid and the extraction solvent are mixed; and a final separation separating the raw material fluid, after the specific component has been extracted in the fluid discharged from the extraction unit in a final stage, and the extraction solvent that has extracted the specific component.

6 Claims, 9 Drawing Sheets

(52) U.S. Cl.
CPC ...... *B01D 11/0488* (2013.01); *B01D 11/0496* (2013.01); *B01D 2011/002* (2013.01); *B01D 2011/005* (2013.01)

(58) Field of Classification Search
CPC . B01D 11/0457; B01D 11/0284; B01D 11/02; B01D 11/04; B01D 2011/002; B01D 11/0446; B01D 2011/005; B01F 5/0478; B01F 5/0647; B01F 13/0059; B01F 13/1022; B01F 15/0222; B01J 19/0093; B01J 2219/00783; B01J 2219/00873; B01J 2219/00889; B01J 2219/00894; B01J 2219/00905; B01J 2219/00822; B01J 2219/00824; B01J 2219/00828; B01J 2219/00831; B01J 2219/00833; B01J 2219/0086; B01J 2219/00867; B01J 2219/00869

See application file for complete search history.

(56) References Cited

U.S. PATENT DOCUMENTS

| | | | |
|---|---|---|---|
| 4,747,948 A * | 5/1988 | North | B01D 11/0257 210/633 |
| 8,435,387 B2 * | 5/2013 | Hartman | B01D 1/0088 203/28 |
| 2008/0226541 A1 | 9/2008 | Zhou et al. | |
| 2012/0234755 A1 | 9/2012 | Noishiki et al. | |
| 2013/0118588 A1 | 5/2013 | Noishiki et al. | |
| 2014/0299543 A1 * | 10/2014 | Zhou | C22B 3/0005 210/638 |
| 2015/0239738 A1 | 8/2015 | Zhou et al. | |

FOREIGN PATENT DOCUMENTS

| | | | | |
|---|---|---|---|---|
| JP | 4-322701 A | | 11/1992 | |
| JP | 2006167527 A | * | 6/2006 | |
| JP | 2012-196599 | | 10/2012 | |
| JP | 2013-126616 | | 6/2013 | |
| WO | WO 2008/112999 A1 | | 9/2008 | |
| WO | WO-2012079130 A1 | * | 6/2012 | C22B 3/005 |

OTHER PUBLICATIONS

Machine translation of JP-2006167527-A.*
International Search Report dated Jan. 20, 2015, in PCT/JP2014/078150 filed Oct. 22, 2014.
Extended European Search Report dated May 24, 2017 in European Patent Application No. 14863253.2.

* cited by examiner

EXTRACTION AND SEPARATION METHOD

TECHNICAL FIELD

The present invention relates to an extraction and separation method for extracting and separating a specific component from a raw material fluid.

BACKGROUND ART

Hitherto, extraction and separation methods for extracting and separating a specific component from a raw material fluid have been known. For example, Patent Document 1 as described below discloses an example of such extraction and separation methods.

In Patent Document 1 as described below, an apparatus including a flow passage structure body in the interior of which a multitude of flow passages are provided is used for extracting and separating a specific component (extract) from a raw material fluid (fluid subject to extraction). Through each flow passage in the flow passage structure body, the raw material fluid and an extracting agent are allowed to flow while being in contact with each other, and during a flowing process thereof, the specific component is extracted from the raw material fluid to the extracting agent. A separation header is attached to an outer surface of the flow passage structure body. Outlet ports of upstream flow passages and inlet ports of downstream flow passages that are provided in the flow passage structure body communicate with an interior space of the separation header. A mixed fluid of the raw material fluid and the extracting agent that has flown through the upstream flow passages is discharged from the outlet ports of these flow passages to the interior space of the separation header. The mixed fluid that has been discharged to the interior space of the separation header is separated in the interior space due to a specific gravity difference into the raw material fluid and the extracting agent. The separated raw material fluid is fed into the downstream flow passages, and extraction of the specific component is further performed.

In the extraction and separation method disclosed in Patent Document 1 as described above, the mixed fluid discharged to the interior space of the separation header is thoroughly separated into the raw material fluid and the extracting agent. Consequently, a retention time of the mixed fluid in the separation header increases, and as a result, a treatment time required for extraction and separation increases. Moreover, the separation header is required to include a large-volume interior space that allows the mixed fluid to remain until the mixed fluid is thoroughly separated into the raw material fluid and the extracting agent. Consequently, the separation header is enlarged, and accordingly the whole body of a separation device is enlarged.

CITATION LIST

Patent Document

Patent Document 1: JP 2013-126616 A

SUMMARY OF THE INVENTION

An object of the present invention is to shorten a treatment time required for extracting and separating a specific component from a raw material fluid while downsizing an extraction device.

An extraction and separation method according to one aspect of the present invention is a method for extracting and separating a specific component from a raw material fluid, including: an extraction and separation step of extracting and separating the specific component from the raw material fluid, using an extraction device including a plurality of stages of extraction sections sequentially connected to one another, in which the extraction and separation step includes: an extraction step of extracting the specific component from the raw material fluid to an extracting agent while the raw material fluid and the extracting agent having a specific gravity difference relative to the raw material fluid are allowed to flow in the extraction section at each stage while being in contact with each other; a feeding step of feeding at least a part of the fluid discharged from the extraction sections into the subsequent extraction sections while the raw material fluid and the extracting agent are mixed with each other; and a final separation step of separating the fluid discharged from the extraction section at a final stage into the raw material fluid from which the specific component has been extracted and the extracting agent that has extracted the specific component.

DESCRIPTION OF EMBODIMENTS

Hereinafter, embodiments of the present invention will be described with reference to the drawings.

[First Embodiment]

An extraction and separation method according to a first embodiment of the present invention is a method for extracting and separating a specific component from a raw material fluid using an extraction and separation apparatus 1. Firstly, the extraction and separation apparatus 1 used for the extraction and separation method according to the first embodiment will be described with reference to FIGS. 1-4.

Figure 1:
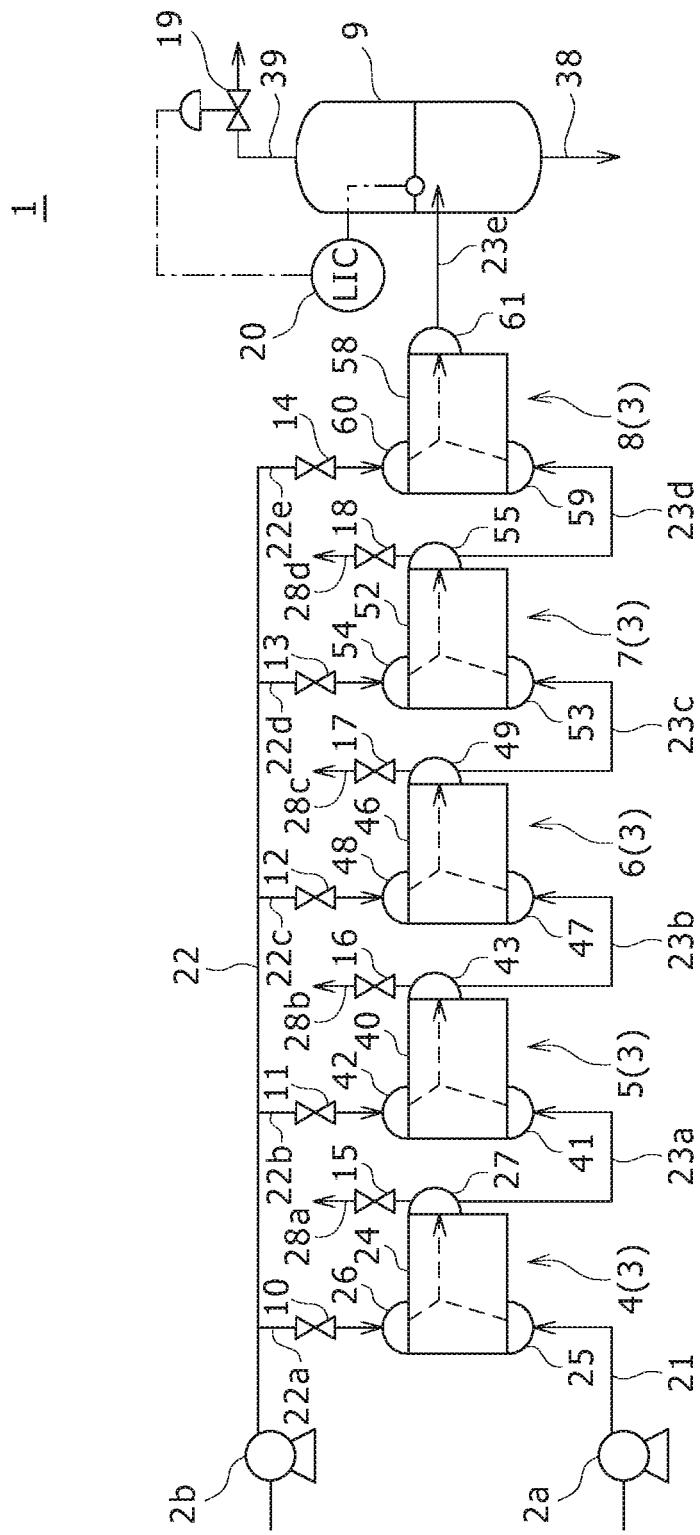
FIG. 1 is a schematic view illustrating an overall configuration of an extraction and separation apparatus according to a first embodiment of the present invention.

In FIG. 1, an overall configuration of the extraction and separation apparatus 1 is schematically illustrated. The extraction and separation apparatus 1 is configured in such a manner as to perform five-stage extraction treatment of the specific component from the raw material fluid and perform separation treatment of separating this fluid that has been subjected to extraction treatment into the raw material fluid and an extracting agent. The extraction and separation apparatus 1 is configured in such a manner as to perform extraction using an extracting agent having a specific gravity lower than that of the raw material fluid. This extraction and separation apparatus 1 includes a raw material supply pump 2a, an extracting agent supply pump 2b, an extraction device 3 including first to fifth extraction sections 4-8 sequentially connected to one another, a settler 9, first to fifth inflow rate adjustment valves 10-14, first to fourth discharge rate adjustment valves 15-18, a final discharge rate adjustment valve 19, and a liquid level meter 20.

The raw material supply pump 2a is a pump that supplies (delivers) to the first extraction section 4 of the extraction device 3 the raw material fluid containing the specific component.

The extracting agent supply pump 2b is a pump that supplies (delivers) to the first to fifth extraction sections 4-8 of the extraction device 3 the extracting agent for extracting the specific component from the raw material fluid.

The extraction device 3 is configured to perform extraction of the specific component from the raw material fluid to the extracting agent in the first to fifth extraction sections 4-8, sequentially. In other words, the extraction device 3 is configured in such a manner as to perform five-stage extraction treatment. Note that the first extraction section 4 is an example of an "extraction section at a first stage" in the present invention. Meanwhile, the fifth extraction section 8 is an example of an "extraction section at a final stage" in the present invention.

Figure 2:
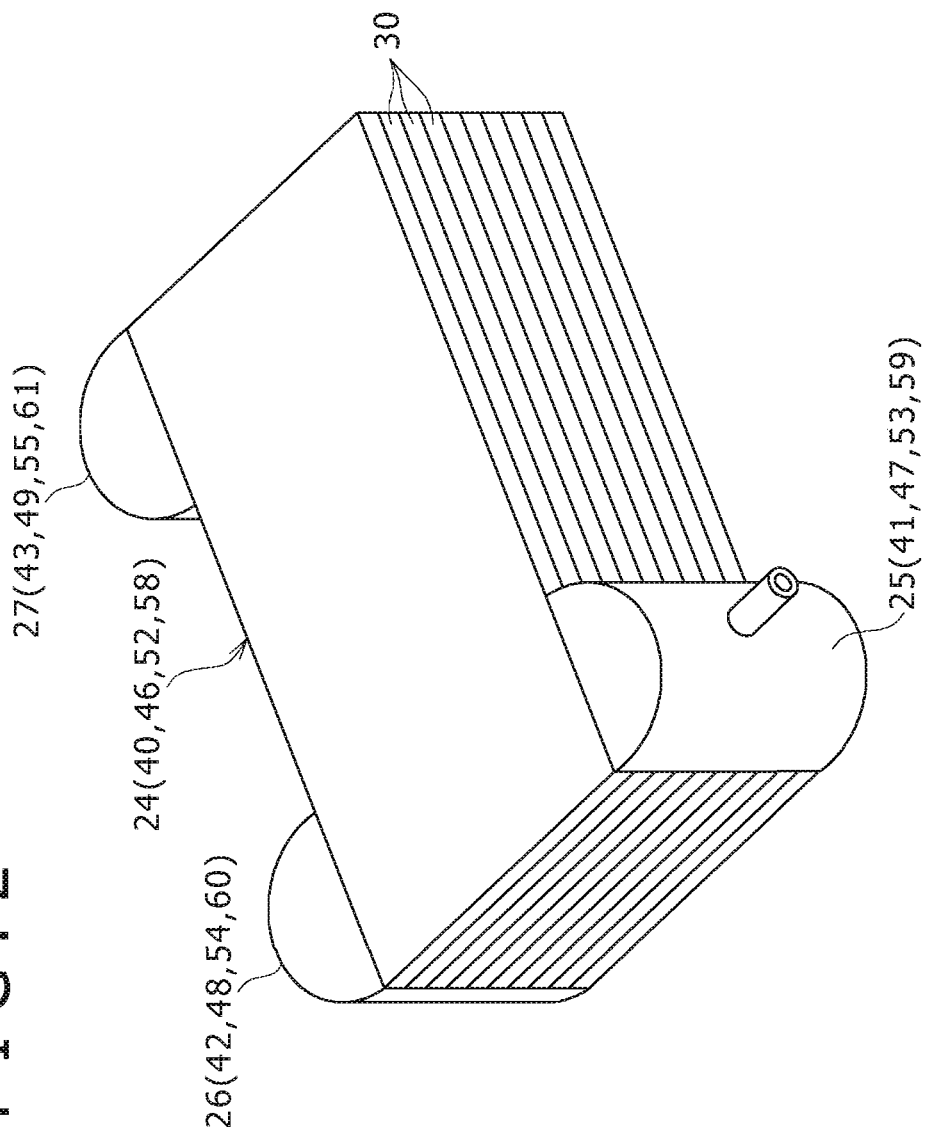
FIG. 2 is a perspective view illustrating an overall configuration of an extraction section of the extraction and separation apparatus as illustrated in FIG. 1.

The first extraction section 4 is configured to perform extraction treatment at the first stage. In FIG. 1, the first to fifth extraction sections 4-8 are schematically illustrated, and specifically the first extraction section 4 has a structure, for example, as illustrated in FIG. 2. The first extraction section 4 includes a stacked body 24, a raw material supply header 25, an extracting agent supply header 26, and a discharge header 27.

Figure 3:
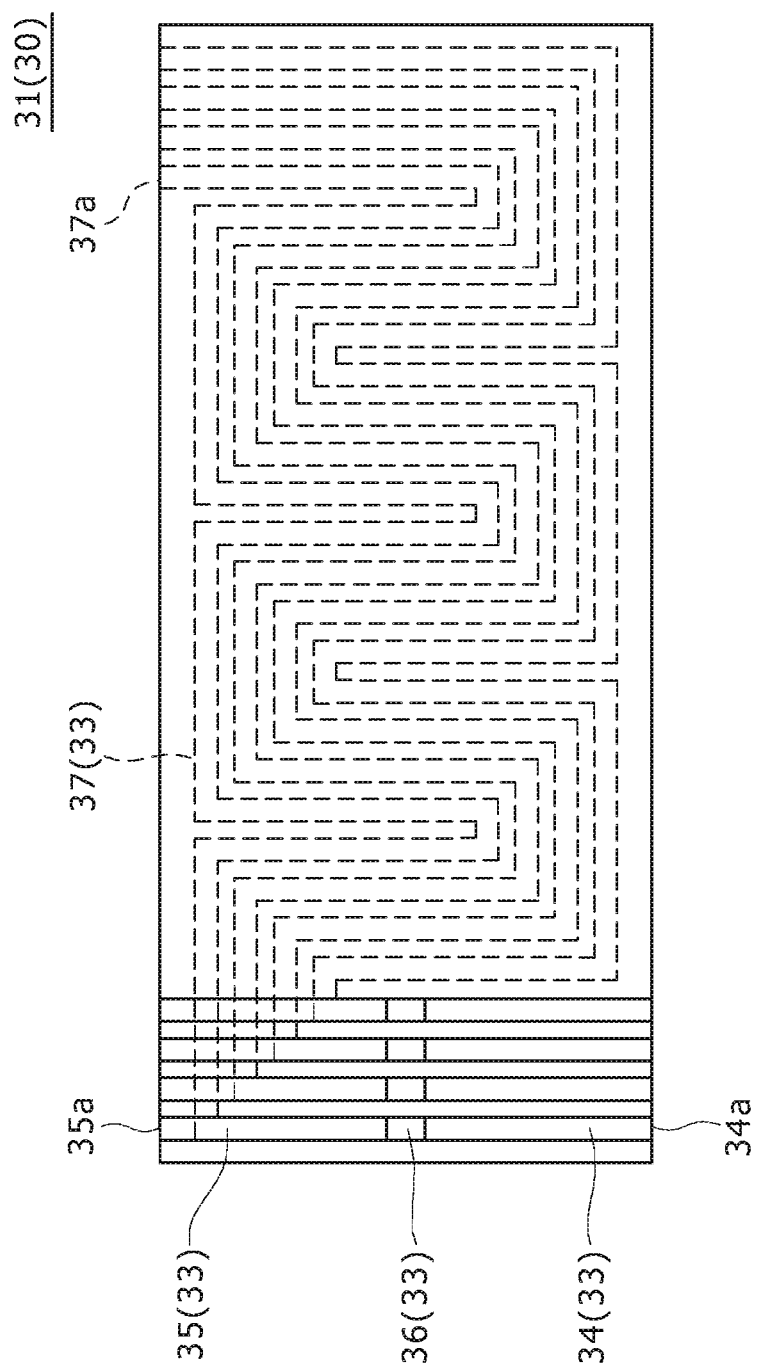
FIG. 3 is a plan view illustrating an extraction plate that forms a stacked body of the extraction section as illustrated in FIG. 2.

The stacked body 24 is formed with a multitude of plates 30 that are stacked one upon another in a thickness direction. The multitude of plates 30 that form the stacked body 46 include a plurality of extraction plates 31 (see FIG. 3). Each extraction plate 31 is provided with a multitude of extraction flow passages 33 that are microchannels (fine flow passages) through which the raw material fluid and the extracting agent are allowed to flow. Each extraction flow passage 33 has a structure, for example, as illustrated in FIG. 3. Specifically, each extraction flow passage 33 includes a raw material feeding passage 34, an extracting agent feeding passage 35, a confluence portion 36, and a confluence fluid flow passage 37. The raw material feeding passage 34 is a part which the raw material fluid is fed into and flows through. The extracting agent feeding passage 35 is a part which the extracting agent is fed into and flows through. The confluence portion 36 is connected to downstream end portions of the raw material feeding passage 34 and the extracting agent feeding passage 35, and is a part in which the raw material fluid that has flown through the raw material feeding passage 34 and the extracting agent that has flown through the extracting agent feeding passage 35 conflow each other. The confluence fluid flow passage 37 is connected to a downstream side of the confluence portion 36, and is a part through which the raw material fluid and the extracting agent that have conflown each other flow while being in contact with each other.

Each raw material feeding passage 34 and each extracting agent feeding passage 35 are formed by forming grooves in one of plate surfaces of the extraction plate 31 in the thickness direction, and sealing openings of the grooves formed in this plate surface with another plate 30 stacked and joined onto this plate surface. Meanwhile, each confluence fluid flow passage 37 is formed by forming a groove in the other plate surface on a side opposite to the one of the plate surfaces of the extraction plate 31 in which the raw material feeding passage 34 and the extracting agent feeding passage 35 are formed, and sealing an opening of the groove formed in this plate surface with another plate 30 stacked and joined onto this plate surface. Meanwhile, each confluence portion 36 is configured to be a through hole penetrating the extraction plate 31 in the thickness direction. The plurality of extraction flow passages 33 provided in each extraction plate 31 are arranged in a direction orthogonal to a stacking direction of the extraction plates 31. The stacked body 24 is configured to be a multichannel structure body in the interior of which the multitude of extraction flow passages 33 are provided.

The raw material supply header 25 (see FIG. 2) is a header for distributing and supplying the raw material fluid to each raw material feeding passage 34 of the corresponding extraction flow passage 33 (see FIG. 3). The raw material supply header 25 is attached to the stacked body 24 such that an interior space thereof communicates with an inlet port 34a of the raw material feeding passage 34 of every extraction flow passage 33 provided in the stacked body 24. To the raw material supply header 25, a raw material supply pipe 21 connected to a discharge port of the raw material supply pump 2a (see FIG. 1) is connected.

The extracting agent supply header 26 (see FIG. 2) is a header for supplying the extracting agent to each extracting agent feeding passage 35 of the corresponding extraction flow passage 33 (see FIG. 3). The extracting agent supply header 26 is attached to the stacked body 24 such that an interior space thereof communicates with an inlet port 35a of the extracting agent feeding passage 35 of every extraction flow passage 33 provided in the stacked body 24. To the extracting agent supply header 26, a first branch pipe 22a of an extracting agent supply pipe 22 connected to a discharge port of the extracting agent supply pump 2b (see FIG. 1) is connected.

The discharge header 27 (see FIG. 2) is a header into which a mixed fluid of the raw material fluid and the extracting agent is discharged from an outlet port 37a of each confluence fluid flow passage 37 of the corresponding extraction flow passage 33 (see FIG. 3). The discharge header 27 is attached to the stacked body 24 such that an interior space thereof communicates with the outlet port 37a of the confluence fluid flow passage 37 of every extraction flow passage 33 provided in the stacked body 24. To a lower portion of the discharge header 27, a first connection pipe 23a (see FIG. 1) is connected. To an upper portion of the discharge header 27, a first discharge pipe 28a is connected.

The second to fifth extraction sections 5-8 are configured to perform. extraction treatment at the second to fifth stages, respectively. The second to fifth extraction sections 5-8 each have a configuration similar to that of the first extraction section 4. Specifically, the second extraction section 5 includes a stacked body 40, a raw material supply header 41, an extracting agent supply header 42, and a discharge header 43. The third extraction section 6 includes a stacked body 46, a raw material supply header 47, an extracting agent supply header 48, and a discharge header 49. The fourth extraction section 7 includes a stacked body 52, a raw material supply header 53, an extracting agent supply header 54, and a discharge header 55. The fifth extraction section 8 includes a stacked body 58, a raw material supply header 59, an extracting agent supply header 60, and a discharge header 61. The stacked bodies 40, 46, 52, 58 of the second to fifth extraction sections 5-8, respectively have a structure corresponding to the stacked body 24 of the first extraction section 8. The raw material supply headers 41, 47, 53, 59 of the second to fifth extraction sections 5-8, respectively, have a structure corresponding to the raw material supply header 25 of the first extraction section 8. The extracting agent supply headers 42, 48, 54, 60 of the second to fifth extraction sections 5-8, respectively, have a structure corresponding to the extracting agent supply header 26 of the first extraction section 4. The discharge headers 43, 49, 55, 61 of the second to fifth extraction sections 5-8, respectively have a structure corresponding to the discharge header 27 of the first extraction section 8. Note that the discharge headers 27, 43, 49, 55, 61 are an example of a discharge portion in the present invention.

The raw material supply header 41 of the second extraction section 5 is connected through the first connection pipe 23a to the discharge header 27 of the first extraction section 4. In other words, the inlet port 34a of the raw material feeding passage 34 of each extraction flow passage 33 of the second extraction section 5 communicates through an interior space of the raw material supply header 41 of the second extraction section 5 and a flow passage in the first connection pipe 23a with the interior space of the discharge header 27 of the first extraction section 4. To the extracting agent supply header 42 of the second extraction section 5, a second branch pipe 22b of the extracting agent supply pipe 22 connected to the discharge port of the extracting agent supply pump 2b is connected. To a lower portion of the discharge header 43 of the second extraction section 5, a second connection pipe 23b is connected. To an upper portion of the discharge header 43, a second discharge pipe 28b is connected.

The raw material supply header 47 of the third extraction section 6 is connected through the second connection pipe 23b to the discharge header 43 of the second extraction section 5. In other words, the inlet port 34a of the raw material feeding passage 34 of each extraction flow passage 33 of the third extraction section 6 communicates through an interior space of the raw material supply header 47 of the third extraction section 6 and a flow passage in the second connection pipe 23b with the interior space of the discharge header 43 of the second extraction section 5. To the extracting agent supply header 48 of the third extraction section 6, a third branch pipe 22c of the extracting agent supply pipe 22 connected to the discharge port of the extracting agent supply pump 2b is connected. To a lower portion of the discharge header 49 of the third extraction section 6, a third connection pipe 23c is connected. To an upper portion of the discharge header 49, a third discharge pipe 28c is connected.

The raw material supply header 53 of the fourth extraction section 7 is connected through the third connection pipe 23c to the discharge header 49 of the third extraction section 6. In other words, the inlet port 34a of the raw material feeding passage 34 of each extraction flow passage 33 of the fourth extraction section 7 communicates through an interior space of the raw material supply header 53 of the fourth extraction section 7 and a flow passage in the third connection pipe 23c with the interior space of the discharge header 49 of the third extraction section 6. To the extracting agent supply header 54 of the fourth extraction section 7, a fourth branch pipe 22d of the extracting agent supply pipe 22 connected to the discharge port of the extracting agent supply pump 2b is connected. To a lower portion of the discharge header 55 of the fourth extraction section 7, a fourth connection pipe 23d is connected. To an upper portion of the discharge header 55, a fourth discharge pipe 28d is connected.

The raw material supply header 59 of the fifth extraction section 8 is connected through the fourth connection pipe 23d to the discharge header 55 of the fourth extraction section 7. In other words, the inlet port 34a of the raw material feeding passage 34 of each extraction flow passage 33 of the fifth extraction section 8 communicates through an interior space of the raw material supply header 59 of the fifth extraction section 8 and a flow passage in the fourth connection pipe 23d with the interior space of the discharge header 55 of the fourth extraction section 7. To the extracting agent supply header 60 of the fifth extraction section 8, a fifth branch pipe 22e of the extracting agent supply pipe 22 connected to the discharge port of the extracting agent supply pump 2b is connected. To the discharge header 61 of the fifth extraction section 8, a fifth connection pipe 23e is connected.

The first inflow rate adjustment valve 10 is provided to the first branch pipe 22a. The second inflow rate adjustment valve 11 is provided to the second branch pipe 22b. The third inflow rate adjustment valve 12 is provided to the third branch pipe 22c. The fourth inflow rate adjustment valve 13 is provided to the fourth branch pipe 22d. The fifth inflow rate adjustment valve 14 is provided to the fifth branch pipe 22e. The first to fifth inflow rate adjustment valves 10-14 are configured to adjust a flow rate of the extracting agent that is fed, through the first to fifth branch pipes 22a-22e to which these are respectively provided, into the extracting agent supply headers 26, 42, 48, 54, 60 of the first to fifth extraction sections 4-8, respectively.

The first discharge rate adjustment valve 15 is provided to the first discharge pipe 28a. The second discharge rate adjustment valve 16 is provided to the second discharge pipe 28b. The third discharge rate adjustment valve 17 is provided to the third discharge pipe 28c. The fourth discharge rate adjustment valve 18 is provided to the fourth discharge pipe 28d. The first to fourth discharge rate adjustment valves 15-18 are configured to adjust, through the first to fourth discharge pipes 28a-28d to which these are respectively provided, a flow rate of the extracting agent discharged from an upper portion of the discharge headers 27, 43, 49, 55 of the first to fourth extraction sections 4-7, respectively.

The settler 9 is connected through the fifth connection pipe 23e to the discharge header 61 of the fifth extraction section 8. The settler 9 includes an interior space into which the fluid discharged from an interior space of the discharge header 61 of the fifth extraction section 8 to the fifth connection pipe 23e is fed through the fifth connection pipe 23e. The settler 9 is configured to allow the fluid fed into the interior space thereof to remain, thereby separating this fluid due to a specific gravity difference into the extracting agent that has extracted the specific component and the raw material fluid from which the specific component has been extracted. To a lower portion of the settler 9, a lower side discharge pipe 38 is connected. To an upper portion of the settler 9, an upper side discharge pipe 39 is connected. The interior space of the settler 9 is configured such that the separated raw material fluid collects at a lower side while the separated extracting agent collects at an upper side relative to this raw material fluid. The raw material fluid separated in the interior space of the settler 9 is discharged through the lower side discharge pipe 38. The extracting agent separated in the interior space of the settler 9 is discharged through the upper side discharge pipe 39.

The final discharge rate adjustment valve 19 is provided to the upper side discharge pipe 39. The final discharge rate adjustment valve 19 is configured to adjust a flow rate of the extracting agent that is discharged from the interior space of the settler 9 through the upper side discharge pipe 39. Meanwhile, the liquid, level meter 20 is provided to the settler 9. The liquid level meter 20 is configured to detect a height position of an interface between the raw material fluid and the extracting agent that have been separated in the interior space of the settler 9. Data of the height position of the interface that is detected by the liquid level meter 20 is input to the final discharge rate adjustment valve 19. The final discharge rate adjustment valve 19 controls a flow rate of the extracting agent discharged from the settler 9 on the basis of the input data of the height position of the interface such that the height position of the interface is maintained at a side upper than a height position of a portion at which the fifth connection pipe 23e is connected to the settler 9.

Next, the extraction and separation method according to the first embodiment of the present invention will be described.

In this extraction and separation method according to the first embodiment, an extraction and separation step of extracting and separating the specific component from the raw material fluid using the extraction and separation apparatus 1 having the configuration as described above is performed. Hereinafter, the extraction and separation process step will he specifically described.

First, the raw material fluid is supplied from the raw material supply pump 2a through the raw material supply pipe 21 to the raw material supply header 25 of the first extraction section 4, while the extracting agent is supplied from the extracting agent supply pump p 2b through the first branch pipe 22a of the extracting agent supply pipe 22 to the extracting agent supply header 26 of the first extraction section 4. As the raw material fluid, a solution containing the specific component, such as rare-earth metal, is used. As the extracting agent, an organic solvent capable of selectively extracting the specific component in the solution of the raw material fluid is used. The raw material fluid fed into the interior space of the raw material supply header 25 is distributed to and fed into the raw material feeding passage 34 of each extraction flow passage 33 in the stacked body 24. The extracting agent fed into the interior space of the extracting agent supply header 26 is distributed to and fed into the extracting agent feeding passage 35 of each extraction flow passage 33 in the stacked body 24.

The raw material fluid fed into each raw material feeding passage 34 and the extracting agent fed into each extracting agent feeding passage 35 conflow each other in the corresponding confluence portion 36 and flow toward the corresponding confluence fluid flow passage 37. Through each confluence fluid flow passage 37, the raw material fluid and the extracting agent flow while being in contact with each other, and during a flowing process thereof, the specific component is extracted from the raw material fluid to the extracting agent.

The raw material fluid and the extracting agent that have flown through each confluence fluid flow passage 37 are discharged from the outlet port 37a of the corresponding confluence fluid flow passage 37 to the interior space of the discharge header 27. The raw material fluid and the extracting agent that have been discharged to the interior space of the discharge header 27 are mixed with each other, but remain in this interior space for a predetermined time, whereby the raw material fluid having a high specific gravity shifts downward while the extracting agent having a low specific gravity shifts upward. Then, the extracting agent is discharged from an upper portion of the interior space of the discharge header 27 through the first discharge pipe 28a, while the fluid located at a lower portion of the interior space of the discharge header 27 is discharged to the first connection pipe 23a. In other words, the fluid discharged to the interior space of the discharge header 27 is roughly separated due to a specific gravity difference, and the extracting agent which is one fluid that has been separated is discharged to the first discharge pipe 28a while the other fluid that has been separated is discharged to the first connection pipe 23a.

Here, the first discharge rate adjustment valve 15 adjusts a flow rate of the extracting agent discharged from the discharge header 27, whereby a time in which the fluid remains in the interior space of the discharge header 27 is set to be shorter than a retention time required for the fluid to thoroughly separate in the interior space of the discharge header 27 into the raw material fluid and the extracting agent. Consequently, the fluid discharged from the interior space of the discharge header 27 to the first connection pipe 23a is a mixed fluid in which the raw material fluid and the extracting agent are mixed with each other. This fluid discharged to the first connection pipe 23a is a fluid in which a rate of the extracting agent in this fluid is lower than a rate of the raw material fluid in this fluid. In detail, the time in which the fluid remains in the interior space of the discharge header 27 as described above is set to he such a time that the mixed fluid in which maximum 10% in terms of volume fraction of the extracting agent is mixed with the raw material fluid is discharged from the interior space of the discharge header 27 to the first connection pipe 23a. Then, the mixed fluid discharged from the discharge header 27 of the first extraction section 4 to the first connection pipe 23a is fed into the raw material supply header 41 of the second extraction section 5. Note that the mixed fluid separated in the discharge header 27 and discharged to the first connection pipe 23a is an example of a first fluid in the present invention. Meanwhile, the extracting agent separated in the discharge header 27 and discharged to the first discharge pipe 28a is an example of a second fluid in the present invention.

Further, according to this first embodiment, the first inflow rate adjustment valve 10 adjusts a flow rate of the extracting agent supplied to the extracting agent supply header 26 and flowing toward each extraction flow passage 33, while the first discharge rate adjustment valve 15 adjusts a flow rate of the extracting agent discharged from the discharge header 27 through the first discharge pipe 28a. Through this adjustment, a time in which the raw material fluid and the extracting agent are allowed to be in contact with each other in the first extraction section 4 is set to be shorter than a time required from when the extracting agent is brought into contact with the raw material fluid to when extraction of the specific component from this raw material fluid to the extracting agent reaches an equilibrium state. In other words, a time required from when the raw material fluid and the extracting agent conflow each other in the confluence portion 36 to when the extracting agent is discharged from the discharge header 27 to the first discharge pipe 28*a* and the fluid is discharged from the discharge header 27 to the first connection pipe 23*a* is set to be shorter than a time required from when the extracting agent is brought into contact with the raw material fluid to when the extraction as described above reaches an equilibrium state.

Figure 4:
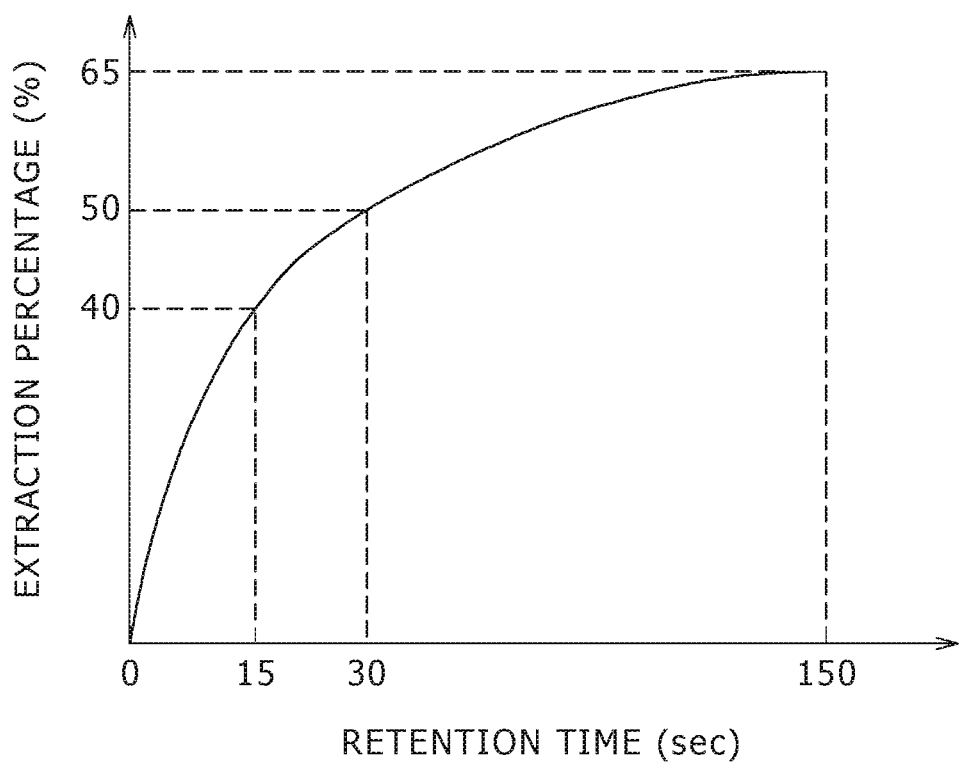
FIG. 4 is a graph illustrating a correlation between a retention time in which a raw material fluid and an extracting agent are allowed to be in contact with each other and an extraction percentage of a specific component from the raw material fluid to the extracting agent.

Specifically, there is a correlation, as illustrated in FIG. 4, between a time (retention time) in which the raw material fluid and the extracting agent remain while being contact with each other and an extraction percentage of the specific component from the raw material fluid to the extracting agent. As is clear from this FIG. 4, the time required from when the extracting agent is brought into contact with the raw material fluid to when extraction of the specific component from this raw material fluid to the extracting agent reaches an equilibrium state is 150 seconds or more, and the extraction percentage of the specific component when this equilibrium state is reached is 65%. In this embodiment, the time in which the raw material fluid and the extracting agent are allowed to be contact with each other in the first extraction section 4 is set to be 15 seconds. In these 15 seconds, the extraction percentage of the specific component from the raw material fluid can be reached merely up to 40%, which is lower than the extraction percentage (65%) when extraction reaches the equilibrium state. However, the extraction percentage rapidly increases immediately after the raw material fluid and the extracting agent come into contact with each other, so that the extraction percentage at a certain level relative to the extraction percentage in the equilibrium state can be reached in a short time. Thus, setting the time in which the raw material fluid and the extracting agent are allowed to be in contact with each other in the first extraction section 4 to be 15 seconds is effective for shortening a treatment time.

The fluid that has flown into the raw material supply header 41 of the second extraction section 5 is distributed to and fed into, from the interior space of the raw material supply header 41, the raw material feeding passage 34 of each extraction flow passage 33 in the stacked body 24 of the second extraction section 5. Meanwhile, the extracting agent is supplied from the extracting agent supply pump 2*b* through the second branch pipe 22*b* of the extracting agent supply pipe 22 to the extracting agent supply header 24 of the second extraction section 5. The extracting agent supplied to the extracting agent supply header 42 is distributed to and fed into, from the interior space of the extracting agent supply header 42, the extracting agent feeding passage 35 of each extraction flow passage 33 in the stacked body 24 of the second extraction section 5. Then, in the second extraction section 5, in a manner similar to a process in the first extraction section 4, the fluid fed into each raw material feeding passage 34 and the extracting agent fed into each extracting agent feeding passage 35 conflow each other in the corresponding confluence portion 36 and flow through the corresponding confluence fluid flow passage 37, and the specific component is extracted from the raw material fluid to the extracting agent. Then, the raw material fluid and the extracting agent are discharged from the corresponding confluence fluid flow passage 37 of the second extraction section 5 to the interior space of the discharge header 43. In the discharge header 43, in a manner similar to a process in the discharge header 27 of the first extraction section 4, the extracting agent is discharged from the upper portion in the interior of the discharge header 43 through the second discharge pipe 28*b*, while the fluid in which the raw material fluid is mixed with the extracting agent is discharged from the lower portion in the interior of the discharge header 43 to the second connection pipe 23*b*. The fluid discharged to the second connection pipe 23*b* flows toward the raw material supply header 47 of the third extraction section 6. Meanwhile, in the second extraction section 5, adjustment of a flow rate of the extracting agent supplied to the extracting agent supply header 42 by the second inflow rate adjustment valve 11 and adjustment of a flow rate of the extracting agent discharged from the discharge header 43 by the second discharge rate adjustment valve 16 are also performed in a manner similar to a process in the first extraction section 5.

Processes similar to the processes as described above are sequentially performed also in the third extraction section 6 and the fourth extraction section 7. Then, in the fifth extraction section 8, feeding of the extraction agent, feeding of the fluid that has been discharged from the fourth extraction section 7, and extraction of the specific component from the raw material fluid to the extracting agent in each extraction flow passage 33 are performed in a manner similar to cases of the second to fourth extraction sections 5-7. On the other hand, in the fifth extraction section 8, the fluid that has been discharged from the confluence fluid flow passage 37 of each extraction flow passage 33 to the interior space of the discharge header 61 is all fed through the fifth connection pipe 23*e* into the interior space of the settler 9.

In the settler 9, the fluid fed into the interior space thereof is allowed to remain, whereby this fluid is thoroughly separated due to a specific gravity difference into the extracting agent that has extracted the specific component and the raw material fluid from which the specific component has been extracted. The separated raw material fluid collects at a lower side in the interior space of the settler 9. The separated extracting agent has a specific gravity lower than that of the raw material fluid, so as to collect at an upper side relative to the raw material fluid in the interior space of the settler 9. Then, the raw material fluid from which the specific component has been extracted is discharged from the interior space of the settler 9 through the lower side discharge pipe 38, while the extracting agent that has extracted the extracting agent is discharged from the interior space of the settler 9 through the upper side discharge pipe 39. At this time, the final discharge rate adjustment valve 19 controls a discharge flow rate from the settler 9 on the basis of data of a height position of an interface between the raw material fluid and the extracting agent in the settler 9 that is detected by the liquid level meter 20 such that the height position of the interface is maintained at a side upper than a height position of a portion at which the fifth connection pipe 23*e* is connected to the settler 9.

In such a manner as described above, the extraction and separation method according to the first embodiment of the present invention is performed.

According to the first embodiment, a part of the fluid discharged from the extraction flow passages 33 to the interior space of the corresponding discharge headers 27, 43, 49, 55, 61 in the first to fourth extraction sections 4-7, respectively, is fed into the extraction flow passages 33 of the subsequent extraction sections 5-8 while the raw material fluid and the extracting agent are mixed with each other. Consequently, a treatment time required for extraction and separation can be shortened in comparison with such a case in which a retention portion is provided to every extraction section at each stage, and the fluid discharged from the corresponding extraction flow passages is allowed to remain in the retention portion until the fluid is thoroughly separated into the raw material fluid and the extracting agent.

If a retention portion is provided to every extraction section at each stage, and the fluid discharged from the extraction flow passages of the extraction section at each stage is allowed to remain in the retention portion until the fluid is thoroughly separated into the raw material fluid and the extracting agent, the fluid is each required to remain in each retention portion, and as a result, each retention portion is obliged to be enlarged. On the contrary, according to the first embodiment, the mixed fluid in which the raw material fluid and the extracting agent are mixed with each other is fed from the discharge headers 27, 43, 49, 55 of the first to fourth extraction sections 4-7, respectively, into the extraction flow passages 33 of the subsequent extraction sections 5-8, so that retention times of the fluid in the interior spaces of the discharge headers 27, 43, 49, 55 of the first to fourth extraction sections 4-7 can be shortened. Accordingly, the discharge headers 27, 43, 49, 55 can be reduced. Moreover, performing separation of the fluid in the discharge header 61 of the fifth extraction section 8 is unrequired, and the fluid is separated into the raw material fluid and the extracting agent in the following settler 9, so that a retention time of the fluid in the interior space of the discharge header 61 of the fifth extraction section 8 can be shortened as well. As a result, the discharge header 61 of the fifth extraction section 8 can be reduced as well. Thus, according to the first embodiment, reduction of the extraction device 3 (extraction and separation apparatus 1) is enabled.

Moreover, according to the first embodiment, the fluid discharged from the extraction flow passages 33 of the fifth extraction section 8 to the corresponding discharge header 61 is fed into the interior space of the settler 9 and allowed to remain, whereby the fluid is separated due to a specific gravity difference into the raw material from which the specific component has been extracted and the extracting agent that has extracted the specific component. Accordingly, even though, at each stage, a retention time of the fluid in the discharge headers 27, 43, 49, 55 is shortened so that a treatment time is shortened as described above, the fluid that has been subjected to extraction treatment can be thoroughly separated into the raw material from which the specific component has been extracted and the extracting agent that has extracted the specific component.

Moreover, according to the first embodiment, the mixed fluid separated in the discharge headers 27, 43, 49, 55 of the first to fourth extraction sections 4-7, respectively, in which a rate of the extracting agent is lower than a rate of the raw material fluid is supplied to the extraction flow passages 33 of the subsequent extraction sections. Accordingly increase in flow rate of the fluid to be treated toward the posterior stage extraction sections can be suppressed while extraction of the specific component from the raw material fluid is accelerated toward the posterior stage extraction sections.

Moreover, according to the first embodiment, the extraction and separation apparatus 1 in which the first to fifth extraction sections 4-8 each include the stacked body 24 formed with the multitude of plates 30 that are stacked one upon another, and a plurality of microchannels forming the plurality of extraction flow passages 33 are arranged in each extraction plate 31 of the stacked body 24 of each of the extraction sections 4-8 is used. Then, through the confluence fluid flow passage 37 of each extraction flow passage 33 of each of the first to fifth extraction sections 4-8, as the raw material fluid and the extracting agent are allowed to flow while being in contact with each other, the specific component is extracted from the raw material fluid to the extracting agent. Thus, extraction of the specific component from the raw material fluid to the extracting agent in the confluence fluid flow passages 37 of the multitude of extraction flow passages 33 can be performed. In addition, each confluence fluid flow passage 37 is a microchannel so that a contact area between the raw material fluid and the extracting agent per unit volume in each confluence fluid flow passage 37 can be increased. As a result, a treatment efficiency in extraction and separation can be enhanced.

Moreover, according to the first embodiment, a time in which the raw material fluid and the extracting agent are allowed to be in contact with each other in each of the first to fifth extraction sections 4-8 is set to be shorter than a time required from when the extracting agent is brought into contact with the raw material fluid to when extraction of the specific component from this raw material fluid to the extracting agent reaches an equilibrium state. Accordingly, extraction treatment exhibiting high extraction percentage per unit time and good efficiency can be performed.

[Second Embodiment]

Figure 5:
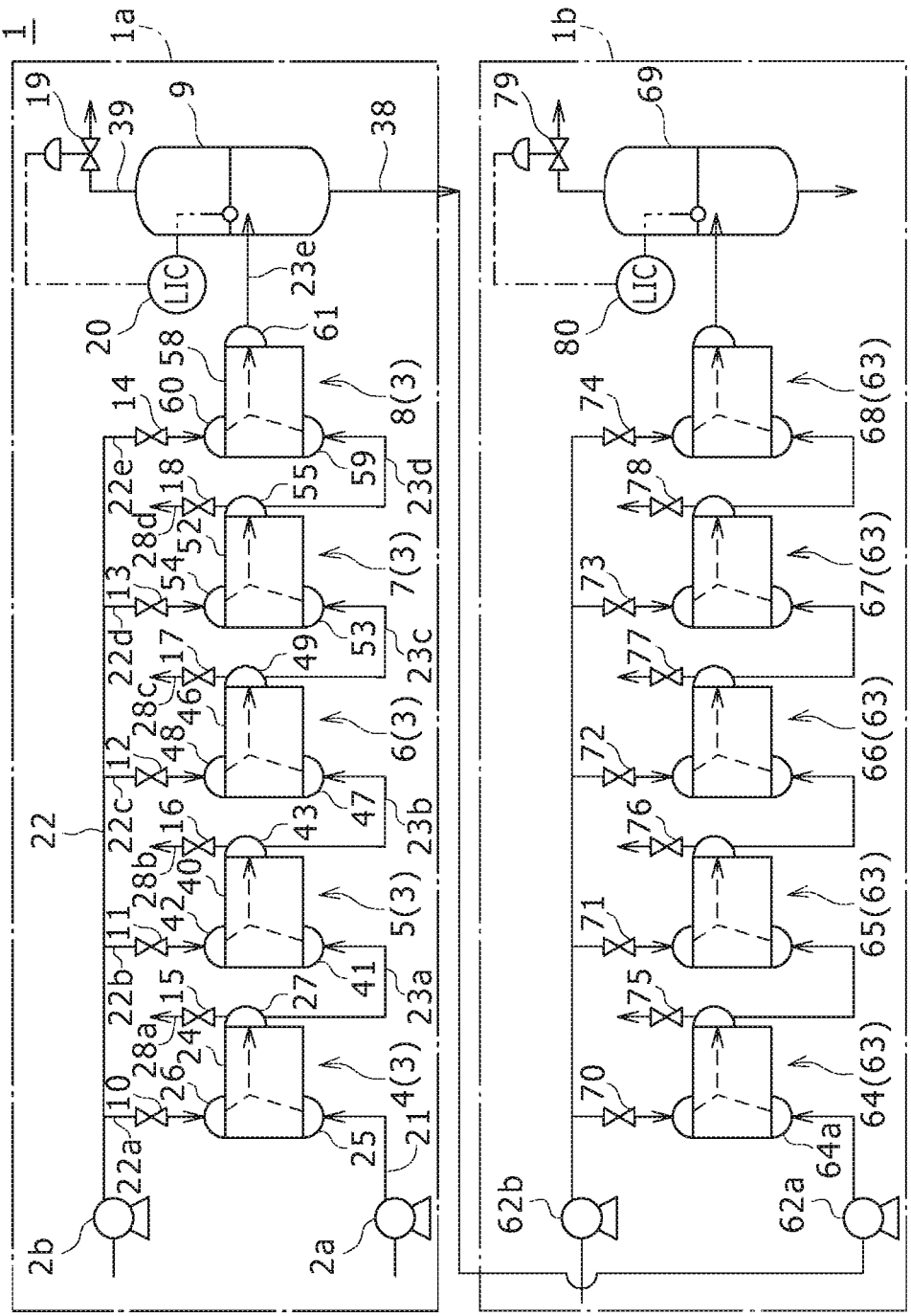
FIG. 5 is a schematic view illustrating an overall configuration of an extraction and separation apparatus according to a second embodiment of the present invention.

Next, an extraction and separation method according to a second embodiment of the present invention will be described. In the extraction and separation method according to the second embodiment, extraction and separation of the specific component from the raw material fluid are performed using the extraction and separation apparatus 1 as illustrated in FIG. 5.

The extraction and separation apparatus 1 according to the second embodiment includes, in addition to an anterior extraction and separation apparatus 1a having a configuration similar to that of the extraction and separation apparatus 1 according to the first embodiment as described above, a posterior extraction and separation apparatus 1b. The posterior extraction and separation apparatus 1b is connected to a posterior stage side of the anterior extraction and separation apparatus 1a, and performs again extraction and separation, similar to extraction and separation performed in the anterior extraction and separation apparatus 1a, with respect to the raw material fluid that has been discharged from the anterior extraction and separation apparatus 1a and has been subjected to extraction and separation treatment.

The anterior extraction and separation apparatus 1a includes a first raw material supply pump 2a, a first extracting agent supply pump 2b, a first extraction device 3, a first settler 9, first to fifth inflow rate adjustment valves 10-14, first to fourth discharge rate adjustment valves 15-18, an anterior final discharge rate adjustment valve 19, and a first liquid level meter 20. A configuration of each element forming the anterior extraction and separation apparatus 1a is similar to a configuration of each element provided with the same reference number in the extraction and separation apparatus 1 according to the first embodiment as described above.

Meanwhile, a configuration of the posterior extraction and separation apparatus 1b is similar to a configuration of the anterior extraction and separation apparatus 1a. In other words, the posterior extraction and separation apparatus 1b has a configuration similar to the configuration of the extraction and separation apparatus 1 according to the first embodiment as described above. Specifically, the posterior extraction and separation apparatus 1b includes a second raw material supply pump 62a, a second extracting agent supply pump 62b, a second extraction device 63 including sixth to tenth extraction sections 64-68, a second settler 69, sixth to tenth inflow rate adjustment valves 70-74, sixth to ninth discharge rate adjustment valves 75-78, a posterior final discharge rate adjustment valve 79, and a second liquid level meter 80.

A configuration of the second extraction device 63 is similar to a configuration of the first extraction device 3. The sixth to tenth extraction sections 64-68 are configured in a manner similar to the first to tenth extraction sections 4-8 and similarly connected to one another through a connection pipe. Moreover, the first settler 9 of the anterior extraction and separation apparatus 1a is connected through the lower side discharge pipe 38 to a raw material supply header 64a of the sixth extraction section 64 of the posterior extraction and separation apparatus 1b.

Meanwhile, the lower side discharge pipe 38 is provided with the second raw material supply pump 62a. The raw material fluid separated in the interior space of the first settler 9 and discharged to the lower side discharge pipe 38 is configured to be delivered by the second raw material supply pump 62a to the raw material supply header 64a of the sixth extraction section 64. A configuration of the second extracting agent supply pump 62b is similar to a configuration of the first extracting agent supply pump 2b. A connection configuration of the second extracting agent supply pump 62b relative to the sixth to tenth extraction sections 64-68 is similar to a connection configuration of the first extracting agent supply pump 2b relative to the first to fifth extraction sections 4-8. The second extracting agent supply pump 62b supplies the extracting agent to each of the sixth to tenth extraction sections 64-68 in a manner similar to a case of the first extracting agent supply pump 2b. Through each unillustrated extraction flow passage of the sixth to tenth extraction sections 64-68, extraction of the specific component from the raw material fluid to the extracting agent is performed in a manner similar to a case of each extraction flow passage 33 of the first to fifth extraction sections 4-8 (see FIG. 3).

Meanwhile, in the posterior extraction and separation apparatus 1b, the sixth to tenth inflow rate adjustment valves 70-74 are provided in a manner similar to the first to fifth inflow rate adjustment valves 10-14 in the anterior extraction and separation apparatus 1a. The sixth to tenth inflow rate adjustment valves 70-74 have a function corresponding to the first to fifth inflow rate adjustment valves 10-14. Moreover, in the posterior extraction and separation apparatus 1b, the sixth to ninth discharge rate adjustment valves 75-78 are provided in a manner similar to the first to fourth discharge rate adjustment valves 15-18 in the anterior extraction and separation apparatus 1a. The sixth to ninth discharge rate adjustment valves 75-78 have a function corresponding to the first to fourth discharge rate adjustment valves 15-18. Meanwhile, in the posterior extraction and separation apparatus 1b, the posterior final discharge rate adjustment valve 79 is provided in a manner similar to the anterior final discharge rate adjustment valve 19 in the anterior extraction and separation apparatus 1a. The posterior final discharge rate adjustment valve 79 has a function corresponding to the anterior final discharge rate adjustment valve 19. Moreover, in the posterior extraction and separation apparatus 1b, the second liquid level meter 80 is provided in a manner similar to the first liquid level meter 20 in the anterior extraction and separation apparatus 1a.

The second liquid level meter 80 has a function corresponding to the first liquid level meter 20.

In the extraction and separation method according to the second embodiment, in the first to fifth extraction sections 4-8 of the first extraction device 3 of the anterior extraction and separation apparatus 1a, the specific component is extracted from the raw material fluid to the extracting agent in a process similar to a case of the extraction and separation method according to the first embodiment as described above. Then, in the first settler 9 of the anterior extraction and separation apparatus 1a, in a manner similar to a case of the settler 9 according to the first embodiment as described above, the fluid that has been subjected to extraction treatment is separated into the raw material from which the specific component has been extracted and the extracting agent that has extracted the specific component.

The raw material fluid separated in the interior space of the first settler 9 of the anterior extraction and separation apparatus 1a is discharged to the lower side discharge pipe 38. The raw material fluid discharged to the lower side discharge pipe 38 is supplied through the lower side discharge pipe 38 by the second raw material supply pump 62a to the raw material supply header 64a of the sixth extraction section 64 of the posterior extraction and separation apparatus 1b, and fed into each unillustrated extraction flow passage of the sixth extraction section 64. Meanwhile, the extracting agent delivered by the second extracting agent supply pump 62b is fed into each unillustrated extraction flow passage of the sixth extraction section 64. Through the confluence fluid flow passage of each unillustrated extraction flow passage of the sixth extraction section 64, as the raw material fluid and the extracting agent flow while being in contact with each other, the specific component is extracted from the raw material fluid to the extracting agent. The fluid in which the raw material fluid that has been subjected to extraction treatment in the sixth extraction section 64 is mixed with the extracting agent is supplied form the sixth extraction section 64 to the subsequent seventh extraction section 65. In the seventh extraction section 65, treatment of extracting the specific component is performed on the fluid supplied from the sixth extraction section 64. Subsequently, similar extraction treatment is sequentially performed in the eighth to tenth extraction sections 66-68. Lastly, in the second settler 69, the fluid that has been subjected to extraction treatment and is discharged from the tenth extraction section 68 is separated into the raw material from which the specific component has been extracted and the extracting agent that has extracted the specific component. A process of extraction treatment performed in the eighth to tenth extraction sections 66-68 is similar to a process of extraction treatment performed in the first to fifth extraction sections 4-8. A process of separation treatment performed in the second settler 69 is similar to a process of separation treatment performed in the first settler 9.

In such a manner as described above, the extraction and separation method according to the second embodiment of the present invention is performed.

According to the second embodiment, the second extraction device 63 and the second settler 69 of the posterior extraction and separation apparatus 1b allow the specific component to be further extracted and separated from the raw material fluid that has been extracted and separated in the first extraction device 3 and the first settler 9 of the anterior extraction and separation apparatus 1a. Accordingly, extraction and separation of the specific component from the raw material fluid can be further accelerated.

Effects obtained by the extraction and separation method according to the second embodiment other than those as described above are similar to effects obtained by the extraction and separation method according to the first embodiment as described above.

[Embodiment Examples]

Next, results of simulations performed to investigate effects obtained when extraction and separation of the specific component from the raw material fluid is performed by the extraction and separation method according to each embodiment as described above will be described.

Firstly, a case in which the specific component is extracted from the raw material fluid containing the specific component having an initial concentration of 100 ppm is supposed. Then, in the extraction and separation method according to the first embodiment as described above, a time from when the raw material fluid and the extracting agent conflow each other in each of the first to fifth extraction sections 4-8 to when the fluid is discharged from the corresponding discharge headers 27, 43, 49, 55, 61, i.e., a time in which the raw material fluid and the extracting agent are in contact with each other in each of the first to fifth extraction sections 4-8 is set to be 15 seconds. In this case, the correlation between the retention time and the extraction percentage as illustrated in FIG. 4 shows that each of the extraction sections 4-8 exhibits the extraction percentage of 40%. As a result, the concentration of the specific component in the raw material fluid discharged from the discharge header 27 of the first extraction section 4 is 60 ppm. The concentration of the specific component in the raw material fluid discharged from the discharge header 43 of the second extraction section 5 is 36 ppm. The concentration of the specific component in the raw material. fluid discharged from the discharge header 49 of the third extraction section 6 is 21.6 ppm. The concentration of the specific component in the raw material fluid discharged from the discharge header 55 of the fourth extraction section 7 is 12.96 ppm. The concentration of the specific component in the raw material fluid discharged from the discharge header 61 of the fifth extraction section 8 is 7.77 ppm. Meanwhile, a total time in which the raw material fluid and the extracting agent are in contact with each other in the first to fifth extraction sections 4-8 is 75 seconds.

Figure 6:
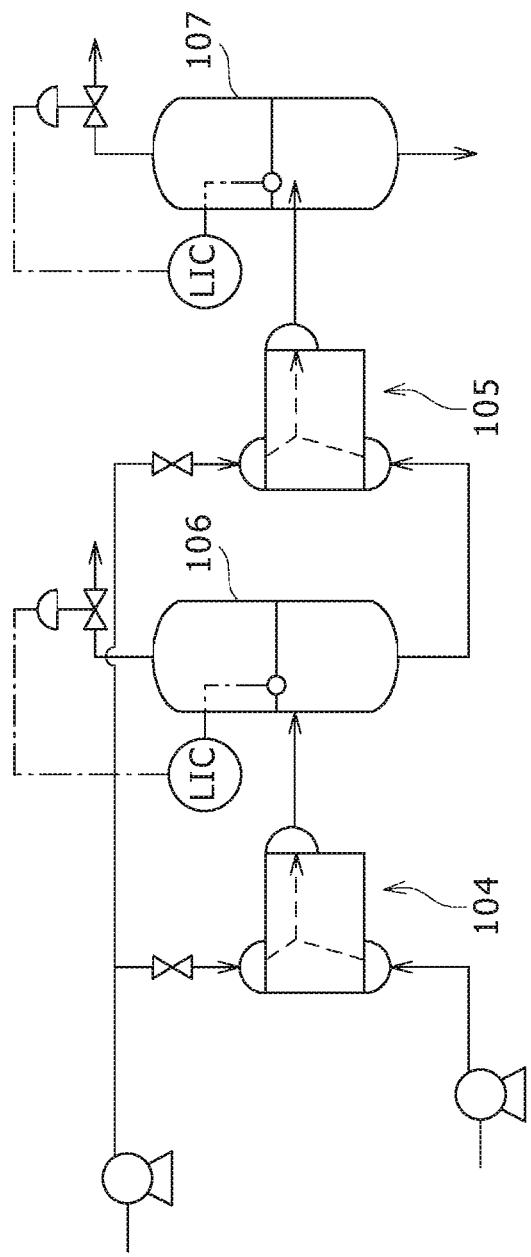
FIG. 6 is a schematic view illustrating an overall configuration of an extraction and separation apparatus according to a comparative example of the present invention.

On the contrary, an extraction and separation method of performing separation treatment in a settler each time extraction treatment is performed in an extraction section at each stage, using an extraction and separation apparatus in which the extraction section at each stage is provided with the settler is supposed as a comparative example of the present invention. In FIG. 6, a part of a configuration of the extraction and separation apparatus used in the extraction and separation method according to this comparative example is illustrated. In FIG. 6, an extraction section 104 at the first stage and a settler 106 at the first stage attached thereto, and an extraction section 105 at the second stage and a settler 107 at the second stage attached thereto are illustrated, and in the extraction and separation method according to this comparative example, the extraction and separation apparatus in which, subsequently to the settler 107 at the second stage, unillustrated three pairs of the extraction section and the settler having a configuration similar to that of the extraction section 105 at the second stage and the settler 107 at the second stage are sequentially connected to one another is used. In other words, the extraction and separation apparatus used in this comparative example includes the five-stage extraction sections and the five-stage settlers, and has a configuration in which the extraction sections and the settlers are alternately connected to one another. A configuration of each extraction section in this comparative example is similar to a configuration of the extraction sections 4-8 according to the first embodiment as described above. Moreover, a configuration of each settler in this comparative example is similar to a configuration of the settler 9 according to the first embodiment as described above.

Then, in the extraction and separation method according to this comparative example, a time from when the raw material fluid and the extracting agent conflow each other in the extraction section at each stage to when the separated raw material fluid is discharged from the settler at the corresponding stage, i.e., a time in which the raw material fluid and the extracting agent are in contact with each other in the extraction section and the settler at each stage is set to be 150 seconds. In this case, the correlation between the retention time and the extraction percentage as illustrated in FIG. 4 shows that extraction and separation treatment at each stage provides the extraction percentage of 65%. Accordingly, when the raw material fluid containing the specific component having an initial concentration of 100 ppm is supplied to the extraction section at the first stage, the concentration of the specific component in the raw material fluid that has been separated in the settler at the first stage is 35 ppm. In this case, the concentration of the specific component in the raw material fluid that has been separated in the settler at the second stage is 12.25 ppm, and the concentration of the specific component in the raw material fluid that has been separated in the settler at the third stage is approximately 4.28 ppm. Further, in this case, the concentration of the specific component in the raw material fluid that has been separated in the settler at the fourth stage is approximately 1.50 ppm, and the concentration of the specific component in the raw material fluid that has been separated in the settler at the fifth stage is approximately 0.52 ppm. Meanwhile, a total time in which the raw material fluid and the extracting agent are in contact with each other in the extraction sections and the settlers at the first to fifth stages is 750 seconds.

The concentration of the specific component in the final raw material fluid that has been subjected to treatment by the extraction and separation method according to the first embodiment as described above (7.77 ppm) is higher than the concentration of the specific component in the final raw material fluid that has been subjected to treatment by the extraction and separation method according to the comparative example (approximately 0.52 ppm), but can be reduced to the comparatively low concentration, which is no greater than 10 ppm. Thus, it has been found out that a useful extraction and separation effect can be obtained. The time in which the raw material fluid and the extracting agent are allowed to be in contact with each other in the extraction and separation method according to the first embodiment (75 seconds) is one tenth of the corresponding time in the extraction and separation method according to the comparative example (750 seconds). Thus, it has been found out that an effect of remarkably reducing a treatment time can be obtained.

Further, when extraction and separation of the specific component from the raw material fluid are desired to be accelerated in comparison with the extraction and separation method according to the first embodiment, the extraction and separation method according to the second embodiment as described above may be employed.

In the extraction and separation method according to the second embodiment as described above, when the raw material fluid containing the specific component having an initial concentration of 100 ppm is supplied to the first extraction section 4 of the anterior extraction and separation apparatus 1a, the concentration of the specific component in the raw material fluid that has been separated in the first settler 9 is 7.77 ppm, which is the same as a case of the first embodiment as described above. When a time in which the raw material fluid and the extracting agent are in contact with each other in each of the sixth to tenth extraction sections 64-68 of the posterior extraction and separation apparatus 1b is set to be 15 seconds which is the same as cases of the first to fifth extraction sections 4-8, the concentration of the specific component in the raw material fluid discharged from the discharge header of the sixth extraction section 64 is approximately 4.7 ppm. In this case, the concentration of the specific component in the raw material fluid discharged from the discharge header of the seventh extraction section 65 is approximately 2.8 ppm, the concentration of the specific component in the raw material fluid discharged from the discharge header of the eighth extraction section 66 is approximately 1.68 ppm, and the concentration of the specific component in the raw material fluid discharged from the discharge header of the ninth extraction section 67 is approximately 1.01 ppm. Further, in this case, after discharge from the discharge header of the final tenth extraction section 68, the concentration of the specific component in the raw material fluid separated in the second settler 69 is approximately 0.60 ppm. Meanwhile, in the extraction and separation method according to the second embodiment, a total time in which the raw material fluid and the extracting agent are in contact with each other in the first to tenth extraction sections 4-8, 64-68 is 150 seconds.

The concentration of the specific component in the final raw material fluid that has been subjected to treatment by the extraction and separation method according to the second embodiment is substantially equal to the concentration of the specific component in the final raw material fluid that has been subjected to treatment by the extraction and separation method according to the comparative example. Thus, it has been found out that a useful extraction and separation effect substantially equal to that of the extraction and separation method according to the comparative example as described above can be obtained by the extraction and separation method according to the second embodiment. Then, the time in which the raw material fluid and the extracting agent are allowed to be in contact with each other in the extraction and separation method according to the second embodiment (150 seconds) is one fifth of the corresponding time in the extraction and separation method according to the comparative example (750 seconds). Thus, it has been found out that an effect of reducing a treatment time can be sufficiently obtained by the extraction and separation method according to the second embodiment as well.

It should be understood that the embodiments disclosed herein are illustrative and nonrestrictive in every respect. The scope of the present invention is defined by the terms of the claims, rather than the description of the embodiments as described above, and includes any modifications within the scope and meaning equivalent to the terms of the claims.

For example, according to the embodiments as described above, the extraction device, the first extraction device, and the second extraction device each include the five-stage extraction sections, but the present invention is not necessarily restricted by such configurations. Specifically, the extraction device may include two or more stages of the extraction sections. Note that, in this case, the settler is provided subsequently to the extraction section at the final stage out of the two or more stages of the extraction sections included in the extraction device, and the fluid discharged from the extraction section at the final stage may be separated into the raw material fluid and the extracting agent.

Alternatively, the settler may be omitted, and a final separation step may be performed by a separation element other than the settler.

Moreover, the configuration of each extraction section is not necessarily limited to the configuration as described above. Specifically, with respect to the disposition and structure of each header provided to each extraction section, the shape, disposition, and number of the extraction flow passages in the stacked bodies, and the like, a configuration other than the configuration as described above and the configuration as illustrated in the drawings may be adopted.

Figure 7:
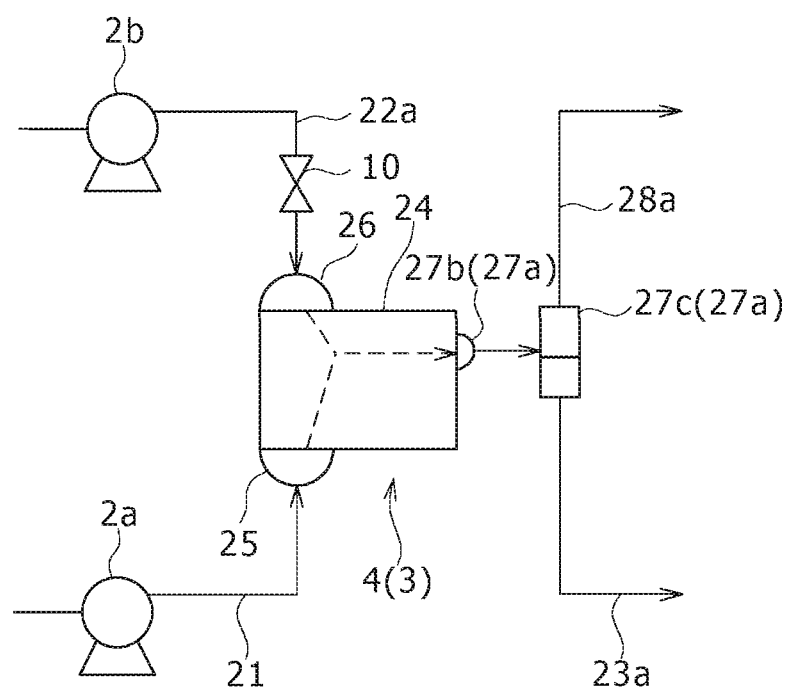
FIG. 7 is a schematic view illustrating a configuration of an extraction section according to a modified example of the present invention.

For example, as in a modified example as illustrated in FIG. 7, a discharge portion 27a may be configured by a discharge header 27b and a simplified fluid separation bath 27c. The simplified fluid separation bath 27c is an example of a fluid separation bath in the present invention. Note that, in FIG. 7, the first extraction section is illustrated as an example, and discharge portions of the extraction sections at the other stages may be similarly configured as well. In this configuration, the discharge header 27b is connected to outlet ports of the corresponding extraction flow passages, and the fluid discharged from the extraction flow passages to the discharge header 27b is fed into an interior space of the simplified fluid separation bath 27c and separated in the interior space due to a specific gravity difference into the extracting agent and the mixed fluid.

According to this configuration, separation in the interior space of the simplified fluid separation bath 27c due to a specific gravity difference can be performed, so that, as the discharge header 27b, a common discharge header failing to have a function of performing separation due to a specific gravity difference may be used. Then, since the discharge header 27b is unrequired to have a function of performing separation due to a specific gravity difference, as the discharge header 27b, a minimum sized discharge header having a small volume may be used. Accordingly, even though the simplified fluid separation bath 27c is provided, an overall size of the extraction device 3 can be kept comparatively compact.

Figure 8:
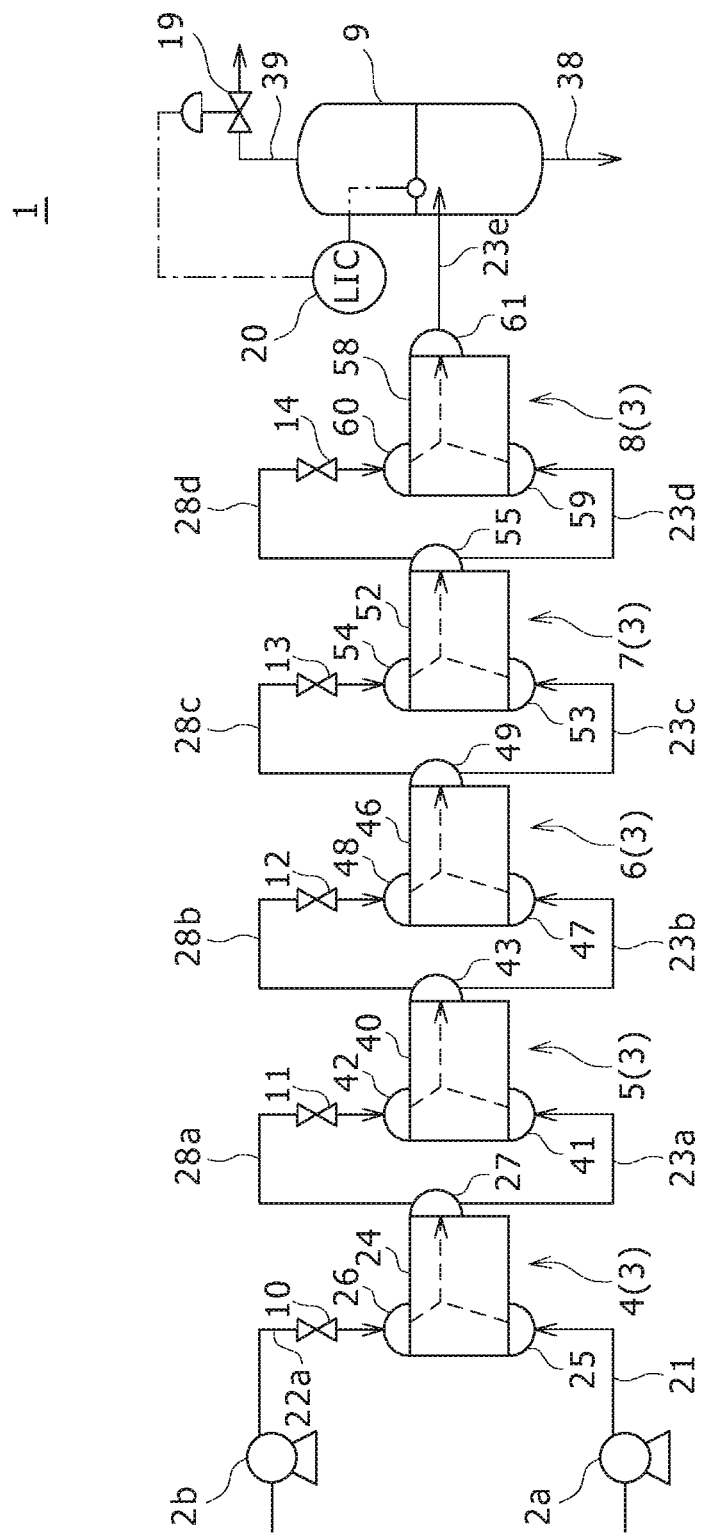
FIG. 8 is a schematic view illustrating an overall configuration of an extraction and separation apparatus according to another modified example of the present invention.

Alternatively, as in another modified example as illustrated in FIG. 8, the first discharge pipe 28a may be connected to the extracting agent supply header 42 of the second extraction section 5, the second discharge pipe 28b may be connected to the extracting agent supply header 48 of the third extraction section 6, the third discharge pipe 28c may be connected to the extracting agent supply header 54 of the fourth extraction section 7, and the fourth discharge pipe 28d may be connected to the extracting agent supply header 60 of the fifth extraction section 8. Thereby, the extracting agent separated in the discharge headers 27, 43, 49, 55 of the first to fourth extraction sections 4-7, respectively, is supplied to the extraction flow passages of the subsequent extraction sections, and this extracting agent can be reused for extracting the specific component from the raw material fluid through these extraction flow passages. Thus, a volume of the extracting agent to be used can be reduced.

Figure 9:
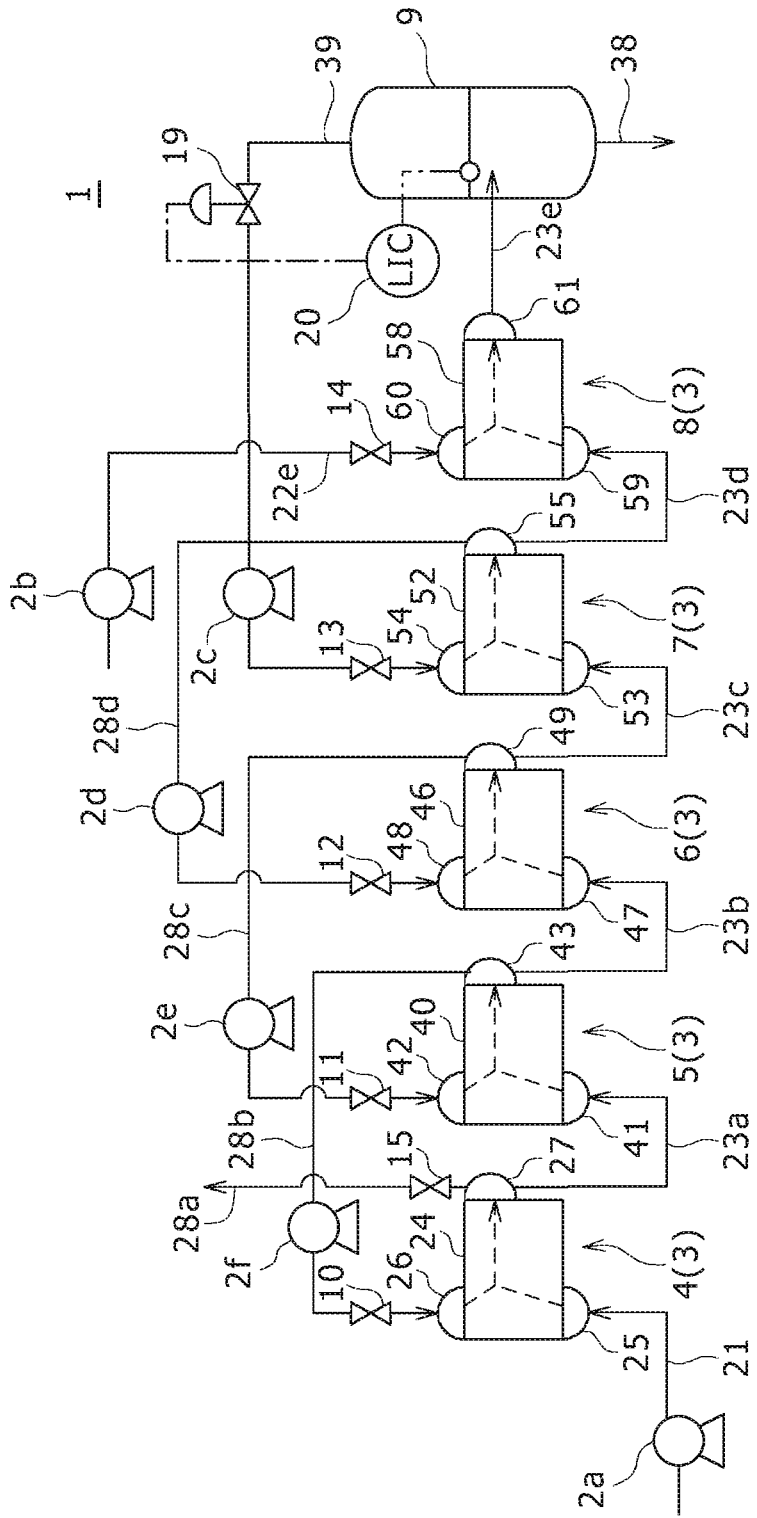
FIG. 9 is a schematic view illustrating an overall configuration of an extraction and separation apparatus according to still another modified example of the present invention.

Alternatively, as in still another modified example as illustrated in FIG. 9, the second discharge pipe 28b may be connected to the extracting agent supply header 26 of the first extraction section 4, the third discharge pipe 28c may be connected to the extracting agent supply header 42 of the second extraction section 5, the fourth discharge pipe 28d may he connected to the extracting agent supply header 48 of the third extraction section 6, and the upper side discharge pipe 39 connected to the upper portion of the settler 9 may be connected to the extracting agent supply header 54 of the fourth extraction section 7. In this modified example, the upper side discharge pipe 39 is provided with a pump 2c that delivers the extracting agent discharged from the settler 9 to the upper side discharge pipe 39 to the extracting agent supply header 54 of the fourth extraction section 7. Meanwhile, the fourth discharge pipe 28d is provided with a pump 2d that delivers the extracting agent discharged from the discharge header 55 of the fourth extraction section 7 to the extracting agent supply header 48 of the third extraction section 6. Moreover, the third discharge pipe 28c is provided with a pump 2e that delivers the extracting agent discharged from the discharge header 49 of the third extraction section 6 to the extracting agent supply header 42 of the second extraction section 5. In addition, the second discharge pipe 28b is provided with a pump 2f that delivers the extracting agent discharged from the discharge header 43 of the second extraction section 5 to the extracting agent supply header 26 of the first extraction section 4. Meanwhile, in this modified example, the extracting agent supply pipe 22 is connected to the extracting agent supply header 60 of the fifth extraction section 8. Through this extracting agent supply pipe 22, the fresh extracting agent is configured to be supplied to the extracting agent supply header 6. In other words, the extracting agent failing to contain the specific component to he extracted is supplied, to the extracting agent supply header 6.

In a configuration of this modified example, the extracting agent separated in the discharge headers 43, 49, 55 of the second to fourth extraction sections 5-7, respectively, is supplied to the extraction flow passages of the precedent extraction sections, while the extracting agent separated in the settler 9 is supplied to the extraction flow passages of the fourth extraction section 7. Thus, the extracting agent separated in the discharge headers 43, 49, 55 of the second to fourth extraction sections 5-7 and the settler 9 can be reused for extracting the specific component from the raw material fluid through the extraction flow passages of the precedent extraction sections. As a result, a volume of the extracting agent to be used can be reduced.

Moreover, the raw material fluid is not necessarily limited to the solution containing the specific component, such as rare-earth metal. Meanwhile, the extracting agent is not necessarily limited to the organic solvent.

Alternatively, the specific component extracted and separated from the raw material fluid may be a component to be removed that is desired to be removed from the raw material fluid, such as impurities and contaminants. In other words, the extraction and separation method of the present invention can be employed for both an object of collecting the useful specific component from the raw material fluid and an object of removing the unnecessary specific component from the raw material fluid.

Alternatively, the raw material fluid may be a fluid having a specific gravity lower than that of the extracting agent. In this case, the configuration of the extraction and separation apparatus as described above is turned upside down, whereby the raw material fluid that has been subjected to extraction treatment in the precedent extraction sections can be supplied, to the subsequent extraction sections.

Moreover, in the discharge portion of the extraction section at each stage, separation due to a specific gravity difference may not be necessarily performed (each stage separation step). For example, the fluid discharged to the discharge portion at each stage may be not allowed to remain and a predetermined volume of the mixed fluid may be taken out from this fluid to be supplied to the subsequent extraction sections. Alternatively, an entire volume of the fluid discharged to the discharge portion at each stage may be supplied to the subsequent extraction sections while the raw material fluid and the extracting agent are mixed with each other.

[Summary of the Embodiments]

The embodiments may be summarized as follows.

The extraction and separation method according to the embodiments is a method for extracting and separating a specific component from a raw material fluid, comprising: an extraction and separation step of extracting and separating the specific component from the raw material fluid, using an extraction device including a plurality of stages of extraction sections sequentially connected to one another, in which the extraction and separation step includes: an extraction step of extracting the specific component from the raw material fluid to an extracting agent while the raw material fluid and the extracting agent having a specific gravity difference relative to the raw material fluid are allowed to flow in the extraction section at each stage while being in contact with each other; a feeding step of feeding at least a part of the fluid discharged from the extraction sections into the subsequent extraction sections while the raw material fluid and the extracting agent are mixed with each other; and a final separation step of separating the fluid discharged from the extraction section at a final stage into the raw material fluid from which the specific component has been extracted and the extracting agent that has extracted the specific component.

In this extraction and separation method, at least a part of the fluid discharged from the extraction sections is fed into the subsequent extraction sections while the raw material fluid and the extracting agent are mixed with each other. Consequently, a treatment time required for extraction and separation can be shortened in comparison with such a case in which a retention portion is provided to every extraction section at each stage, and the fluid is allowed to remain in the retention portion until the fluid is thoroughly separated into the raw material fluid and the extracting agent. Moreover, a large retention portion required for thoroughly separating the fluid into the raw material fluid and the extracting agent is unrequired, so that reduction of the extraction device 3 is enabled. In addition, in this extraction and separation method, the fluid discharged from the extraction section at the final stage is separated into the raw material from which the specific component has been extracted and the extracting agent that has extracted the specific component. Accordingly, even though a retention time of the fluid in the extraction section at each stage is shortened so that a treatment time is shortened as described above, the fluid that has been subjected to extraction treatment can be thoroughly separated into the raw material from which the specific component has been extracted and the extracting agent that has extracted the specific component.

In the extraction and separation method as described above, preferably, in the extraction and separation step, the extraction device in which the extraction section at each stage includes an extraction flow passage through which the fluid that has been fed into the identical extraction section is allowed to flow, and each extraction section other than at least the extraction section at the final stage includes a discharge portion connected to an outlet port of the extraction flow passage is used, and the feeding step includes an each stage separation step of separating, in each extraction section other than the extraction section at the final stage, the fluid discharged from the extraction flow passage to the discharge portion into a first fluid and a second fluid due to a specific gravity difference and performing separation such that the first fluid contains the raw material fluid and the extracting agent, and a separated fluid feeding step of feeding the first fluid separated in the discharge portion in the each stage separation step into the extraction flow passage of the subsequent extraction sections.

In this configuration, the first fluid out of the first and second fluids separated in the each stage separation step is fed into the extraction flow passages of the subsequent extraction sections in the separated fluid feeding step. Accordingly, increase in flow rate of the fluid to be treated toward the posterior stage extraction sections can be suppressed.

In this case, preferably, a rate of the extracting agent in the first fluid separated in the each stage separation step is lower than a rate of the raw material fluid in the first fluid.

According to this configuration, the first fluid separated in the each stage separation step such that a rate of the extracting agent in the first fluid is lower than a rate of the raw material fluid in the first fluid can be fed into the subsequent extraction sections. Accordingly, extraction of the specific component in the raw material fluid can be accelerated while the amount of this raw material fluid is maintained toward the posterior stage extraction sections.

In the configuration in which the feeding step as described above includes the each stage separation step, the discharge portion may be a discharge header connected to the outlet port of the extraction flow passage, and in the each stage separation step, the fluid discharged from the extraction section to an interior space of the discharge header may be separated in the interior space due to a specific gravity difference into the first fluid and the second fluid.

According to this configuration, the fluid discharged from the extraction flow passage can be separated in the interior space of the discharge header into the first fluid and the second fluid. Accordingly, a configuration of the extraction device can be simplified in comparison with a configuration in which the extraction section at each stage includes a fluid separation bath in addition to the discharge header.

Alternatively, in the configuration in which the feeding step as described above includes the each stage separation step, the discharge portion may include a discharge header connected to the outlet port of the extraction flow passage and a fluid separation bath, and in the each stage separation step, the fluid discharged from the extraction flow passage to the discharge header may be fed into an interior space of the fluid separation bath and separated in the interior space of the fluid separation bath due to a specific gravity difference into the first fluid and the second fluid.

According to this configuration, separation in the interior space of the fluid separation bath due to a specific gravity difference can he performed. Accordingly, a common discharge header failing to have a function of performing separation due to a specific gravity difference may be used. Then, in this configuration, the discharge header is unrequired to have a function of performing separation due to a specific gravity difference. Accordingly, a compact discharge header having a small volume may be used. Thus, even though the fluid separation bath is provided, an overall size of the extraction device can be kept compact.

In the configuration in which the feeding step as described above includes the each stage separation step, in the each stage separation step, a predetermined volume of the extracting agent out of the fluid discharged to the discharge portion may be separated as the second fluid in each extraction section, and the extraction and separation step may include an extracting agent supply step of supplying the second fluid separated in the discharge portion in the each stage separation step to the extraction flow passage of the subsequent extraction sections. Alternatively, in the configuration in which the feeding step as described above includes the each stage separation step, in the each stage separation step, a predetermined volume of the extracting agent out of the fluid discharged to the discharge portion may be separated as the second fluid in each extraction section, and the extraction and separation step may include an extracting agent supply step of supplying the second fluid separated in the discharge portion in the each stage separation step to the extraction flow passage of the precedent extraction sections.

According to these configurations, the extracting agent as the second fluid that is separated in the each stage separation step can be reused for extracting the specific component from the raw material fluid. Accordingly, a volume of the extracting agent to be used can he reduced.

In a configuration using the extraction device in which the extraction section at each stage as described above includes the extraction flow passage through which the fluid fed into the extraction section is allowed to flow, preferably, in the extraction and separation step, the extraction device in which the extraction section at each stage includes a plurality of layers that are stacked one upon another and a plurality of microchannels each forming the extraction flow passage are arranged in each layer is used, and in the extraction step, the specific component is extracted from the raw material fluid to the extracting agent through each microchannel included in the extraction section at each stage.

According to this configuration, the specific component can be extracted from the raw material fluid to the extracting agent through the multitude of microchannels in the extraction section at each stage. Accordingly, a treatment efficiency in extraction and separation can be enhanced.

In the extraction and separation method as described above, preferably, in the extraction step, a time in which the raw material fluid and the extracting agent are allowed to be in contact with each other in the extraction section at each stage is set to he shorter than a time required from when the extracting agent is brought into contact with the raw material fluid. to when extraction of the specific component from the raw material fluid to the extracting agent reaches an equilibrium state.

According to this configuration, extraction treatment exhibiting high extraction percentage per unit time and good efficiency can be performed.

In the extraction and separation method as described above, preferably, to the extraction device used in the extraction and separation step, a settler connected to the extraction section at the final stage is attached, and in the final separation step, the fluid discharged from the extraction section at the final stage is fed into an interior space of the settler and allowed to remain in the interior space, whereby the fluid is separated into the raw material fluid from which the specific component has been extracted and the extracting agent that has extracted the specific component.

According to this configuration, in the final separation step, the fluid that has been subjected to extraction treatment is allowed to remain in the settler, whereby this fluid can be thoroughly separated into the raw material fluid from which the specific component has been extracted and the extracting agent that has extracted the specific component.

As described above, according to the embodiments, a treatment time required for extracting and separating the specific component from the raw material fluid can be shortened while the extraction device is reduced.

The invention claimed is:

1. An extraction and separation method for extracting and separating a specific component from a raw material fluid, comprising:
    feeding the raw material fluid and an extracting agent having a specific gravity difference relative to the raw material fluid to a first stage of an extraction device including a plurality of stages of extraction sections sequentially connected to one another;

extracting the specific component from the raw material fluid and extracting the specific component to the extracting agent in each respective stage of the extraction device, while the raw material fluid and the extracting agent are allowed to flow while being in contact with each other;

discharging a mixture of raw material fluid and extracting agent from each respective stage of the extraction device;

feeding at least a part of the mixture discharged from said each respective stage into the subsequent sequentially connected stage of the extraction device;

discharging a mixture of raw material fluid and extracting agent from a final stage of the extraction device; and a final separation step of separating the mixture discharged from the final stage into the raw material fluid from which the specific component has been extracted, and the extracting agent that has extracted the specific component, wherein each said stage of the extraction device includes an extraction flow passage through which the raw material fluid and extracting agent flows, and each said stage other than the final stage includes a discharge portion connected to an outlet port of the extraction flow passage, at each said stage of the extraction device other than the final stage, a mixture of raw material fluid and extracting agent from the extraction flow passage of the respective stage is separated into a first fluid and a second fluid due to a specific gravity difference of the raw material fluid and extracting agent, wherein the first fluid contains the raw material fluid and the extracting agent, at each stage of the extraction device other than the final stage, feeding the first fluid separated in the discharge portion in the respective stage into the extraction flow passage of the subsequent stage of the extraction device, wherein, in said each stage, a predetermined volume of the extracting agent out of the fluid discharged to the discharge portion is separated as the second fluid in each extraction section, and an extracting agent supply step of supplying the second fluid separated in the discharge portion in said each stage to the extraction flow passage of the subsequent extraction sections, wherein the extraction section at each stage includes a plurality of layers that are stacked one upon another and wherein a plurality of microchannels each forming the extraction flow passage are arranged in each layer, and the specific component is extracted from the raw material fluid to the extracting agent through each microchannel included in the extraction section at each stage.

2. The extraction and separation method according to claim 1,
wherein a proportion of the extracting agent in the first fluid in said each respective stage is lower than a proportion of the raw material fluid in the first fluid.

3. The extraction and separation method according to claim 1,
wherein the discharge portion is a discharge header connected to the outlet port of the extraction flow passage, and
in said each stage, the fluid discharged from the extraction section to an interior space of the discharge header is separated in the interior space due to a specific gravity difference into the first fluid and the second fluid.

4. The extraction and separation method according to claim 1,
wherein the discharge portion includes a discharge header connected to the outlet port of the extraction flow passage and a fluid separation bath, and
in said each stage, the fluid discharged from the extraction flow passage to the discharge header is fed into an interior space of the fluid separation bath and separated in the interior space of the fluid separation bath due to a specific gravity difference into the first fluid and the second fluid.

5. The extraction and separation method according to claim 1,
wherein a time in which the raw material fluid and the extracting agent are allowed to be in contact with each other in the extraction section at each stage is set to be shorter than a time required from when the extracting agent is brought into contact with the raw material fluid to when extraction of the specific component from the raw material fluid to the extracting agent reaches an equilibrium state.

6. The extraction and separation method according to claim 1,
wherein the extraction device comprises a settler connected to the extraction section at the final stage, and
the fluid discharged from the extraction section at the final stage is fed into an interior space of the settler and allowed to remain in the interior space before being discharged, whereby the fluid is separated into the raw material fluid from which the specific component has been extracted and the extracting agent that has extracted the specific component.

* * * * *